(12) United States Patent
Fradkin et al.

(10) Patent No.: US 11,561,727 B2
(45) Date of Patent: Jan. 24, 2023

(54) HARDWARE VIRTUALIZATION

(71) Applicant: EMC IP Holding Company LLC, Hopkinton, MA (US)

(72) Inventors: Igor Fradkin, Sharon, MA (US); Scott Rowlands, Marietta, GA (US); Ramprasad Shetty, Southborough, MA (US); David Brown, Natick, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/939,157

(22) Filed: Jul. 27, 2020

(65) Prior Publication Data

US 2022/0027088 A1 Jan. 27, 2022

(51) Int. Cl.
*G06F 3/06* (2006.01)

(52) U.S. Cl.
CPC ......... *G06F 3/0659* (2013.01); *G06F 3/0611* (2013.01); *G06F 3/0613* (2013.01); *G06F 3/0653* (2013.01); *G06F 3/0683* (2013.01)

(58) Field of Classification Search
CPC .... G06F 3/0659; G06F 3/0658; G06F 3/0611; G06F 3/0613; G06F 3/0683; G06F 3/0653; G06F 3/0671
See application file for complete search history.

(56) References Cited

U.S. PATENT DOCUMENTS

| | | | | |
|---|---|---|---|---|
| 2017/0293428 A1* | 10/2017 | Radovanovic | ......... | H02P 23/14 |
| 2020/0356396 A1* | 11/2020 | Bert | ...................... | G06F 3/0671 |
| 2021/0072927 A1* | 3/2021 | Yang | ..................... | G06F 3/0659 |

* cited by examiner

*Primary Examiner* — Ernest Unelus
(74) *Attorney, Agent, or Firm* — Krishnendu Gupta; Nikhil Patel

(57) ABSTRACT

Embodiments of the present disclosure relate to traffic class management of NVMe (non-volatile memory express) traffic. One or more virtual controllers for at least one host adapter (HA) of a storage device are generated. Each virtual controller is assigned a unique controller identifier (ID) Additionally, one or more input/output (IO) queues for each virtual controller are established. Further, IO workloads are processed via each IO queue.

18 Claims, 4 Drawing Sheets

HARDWARE VIRTUALIZATION

BACKGROUND

Storage arrays include powerful computing systems that have substantial amounts of storage connected to them. Storage arrays are configured in such a way that they can present storage to multiple servers, typically over a dedicated network. Accordingly, businesses can store and manage business data in a central location. For example, business can use storage arrays to enable employees to access applications, share data, work on files in conjunction with other employees, and store work product on the arrays. To enable seamless use of the storage arrays, the storage arrays can be virtualized for access by each employee's computing device. Storage virtualization involves presenting a logical view of the storage array's physical storage to each employee's computing device.

SUMMARY

Embodiments of the present disclosure relate to traffic class management of NVMe (non-volatile memory express) traffic. One or more virtual controllers for at least one host adapter (HA) of a storage device are generated. Each virtual controller is assigned a unique controller identifier (ID) Additionally, one or more input/output (IO) queues for each virtual controller are established. Further, IO workloads are processed via each IO queue.

In embodiments, each virtual controller can be provisioned with one or more storage device resources.

In embodiments, each virtual controller can be provided with one or more storage device resources In embodiments, a distinct connection ID can be established for each IO queue In embodiments, each IO queue can be assigned a service level (SL) that defines one or more expected performance metrics for each IO operation queued in each IO queue.

In embodiments, at least one performance metric can correspond to a range of IO operations per second (IOPS).

In embodiments, each IO queue can be provisioned with the one or more storage device resources based on each queue's assigned SL.

In embodiments, an IO queue index can be established for each IO queue. The IO queue index can identify one or more of: IO operations queued in each IO queue, a queue depth, queue total size, and a next available queue memory slot, amongst other queue related information.

In embodiments, communication channels can be established with one or more host devices.

In embodiments, each host device can be provided with information corresponding to each virtual controller and the one or more IO queues established for each virtual controller. The information can enable the host device to direct each IO operation to one of the virtual controllers and a particular IO queue based on the IO queue's assigned SL.

BRIEF DESCRIPTION OF THE DRAWINGS

The foregoing and other objects, features and advantages will be apparent from the following descriptions of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Data has become a key input for driving growth, enabling businesses to differentiate themselves and support a competitive edge. For instance, businesses can harness data to make decisions about finding new customers, increasing customer retention, improving customer service, making better marketing decisions, and predicting sales trends, amongst others. Businesses both generate and collect vast amounts of data and often store the data in a storage array.

A storage array is a storage system that allows an organization to ensure timely delivery of data to end users (e.g., employees), applications, and other information technology (IT) systems over a communications network (e.g., a storage area network (SAN)). A storage array can use a disk storage protocol to deliver block access storage services. For example, block access storage services enable organizations to manage access to critical information stored by one or more disk drives of the storage array. The protocols can include storage array can include multiple disk drives to store, e.g., data and applications. Example protocols can include Fibre Channel, Small Computer Systems Interface (iSCSI), Serial Attached SCSI (SAS), and Fibre Connection (FICON), amongst others, which were originally designed for hard disk drive (HHD) systems.

Because HDDs rely on spinning disks, motors, and read/write heads, using magnetism to store data on a rotating platter, they are prone to breaking down. As such, organizations are increasingly requesting vendors to supply storage arrays with flash-based solid-state drives (SSDs), which do not include moving parts. However, current disk transfer protocols cannot maximize the performance capabilities of SSDs. Thus, vendors have started to design storage arrays that include an NVMe (Non-Volatile Memory Express) architecture. NVMe is a high-performance non uniform memory access (NUMA) interface protocol built on peripheral component interconnect express (PCIe), an interface standard for connecting high-speed components. Accordingly, NVMe allows storage arrays to use the full capabilities of SSDs to increase performance metrics (e.g., response times).

Embodiments of the present disclosure extend these connectivity primitives to map an input/output (IO) operation of a workload to a specific storage array sub-system. For example, the embodiments implement one or more protocols for traffic class management of NVMe (non-volatile memory express) traffic. An embodiment can generate one or more virtual controllers for at least one host adapter (HA) of a storage device. Each virtual controller can be assigned a unique controller identifier (ID) The embodiment can also establish one or more input/output (IO) queues for each virtual controller are established. Further, the embodiment can process IO workloads via each IO queue.

Figure 1:
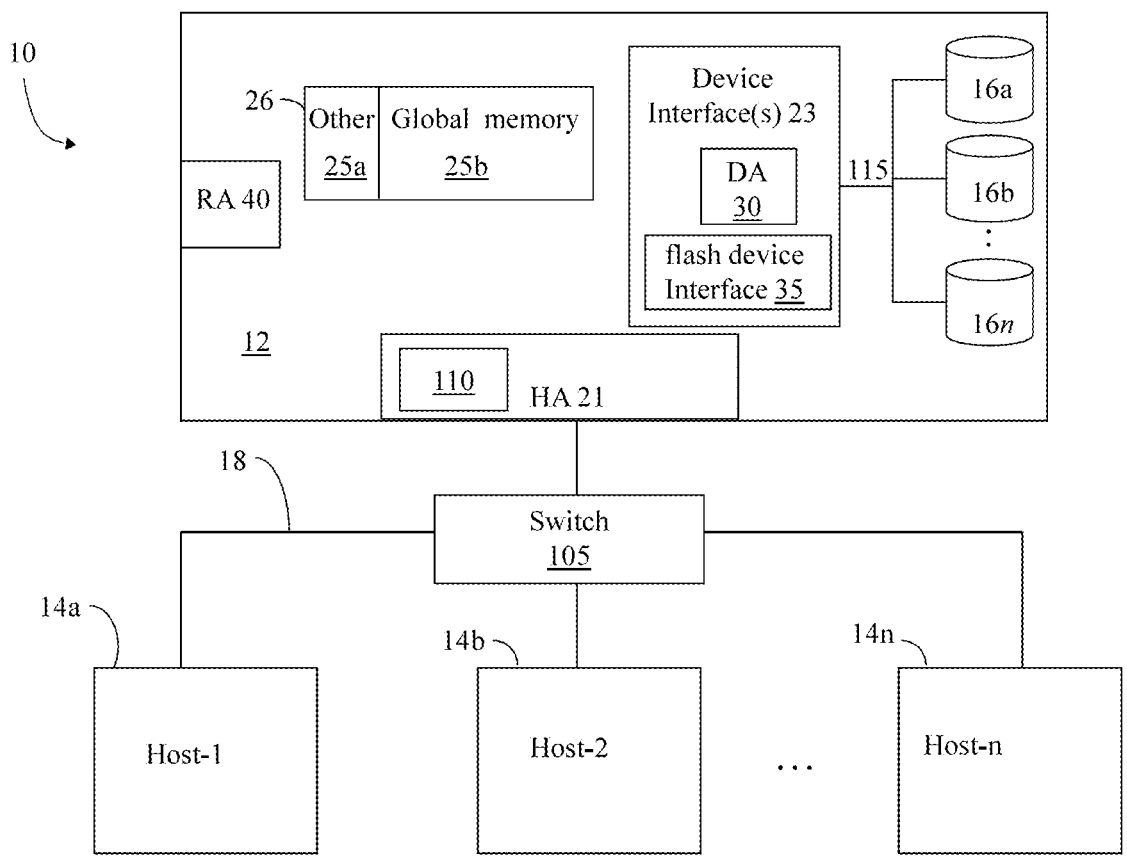
FIG. 1 is a block diagram of an example a storage system in accordance with example embodiments disclosed herein.

Regarding FIG. 1, a system 10 includes a data storage system 12 connected to host systems 14a-n through communication medium 18. In embodiments, the hosts 14a-n can access the data storage system 12, for example, to perform input/output (IO) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host 14a-n can access and communicate with the data storage system 12. The hosts 14a-n can also communicate with other components included in the system 10 via the communication medium 18.

Each of the hosts 14a-n and the data storage system 12 can be connected to the communication medium 18 by any one of a variety of connections as can be provided and supported in accordance with the type of communication medium 18. The processors included in the hosts 14a-n can be any one of a variety of proprietary or commercially available single or multi-processor system, such as an Intel-based processor, or other type of commercially available processor able to support traffic in accordance with each embodiment and application.

It should be noted that the examples of the hardware and software that can be included in the data storage system 12 are described herein in more detail and can vary with each embodiment. Each of the hosts 14a-n and data storage system 12 can all be located at the same physical site or can be in different physical locations. Examples of the communication medium 18 that can be used to provide the different types of connections between the host computer systems and the data storage system of the system 10 can use a variety of different communication protocols such as NVMe, and the like. Some or all the connections by which the hosts 14a-n and data storage system 12 can be connected to the communication medium can pass through other communication devices, such switching equipment 105 that can exist such as a phone line, a repeater, a multiplexer or even a satellite.

Each of the hosts 14a-n can perform distinct types of data operations based on task types. In embodiments, any one of the hosts 14a-n can issue a data request to the data storage system 12 to perform a data operation. For example, an application executing on one of the hosts 14a-n can perform a read or write operation resulting in one or more data requests to the data storage system 12.

Although system 12 is illustrated as a single data storage array, a skilled artisan understands that the system 12 can also represent, for example, multiple data storage arrays alone, or in combination with, other data storage devices, systems, appliances, and/or components having suitable connectivity, such as in a SAN. Further, an embodiment can include data storage arrays or other components from one or more vendors.

The data storage system 12 can include a plurality of data storage devices, such as disks 16a-n. The disks 16a-n can include one or more one or more storage media drives and/or one or more solid state drives (SSDs). An SSD is a data storage device that uses solid-state memory to store persistent data. An SSD using SRAM or DRAM, rather than flash memory, is an example of a RAM drive. SSD can refer to solid state electronics devices as distinguished from electromechanical devices, such as hard drives, having moving parts. Flash devices or flash memory based SSDs are one type of SSD that do not include moving parts.

The data storage array 12 can include several types of adapters or directors, such as an HA 21 (host adapter), RA 40 (remote adapter), and/or device interface 23. Each of the adapters HA 21, RA 40 can include hardware having a processor that can execute operations using code stored on local memory. The HA 21 can manage communications and data operations between one or more host systems 14a-n and the global memory (GM) 25b. In an embodiment, the HA 21 can be a Fibre Channel Adapter (FA) or another adapter which helps host communications. The system 12 can have a design in which the HA 21 is at the system's front-end.

Further, the data storage array 12 can include one or more RAs (e.g., RA 40) that can enable communications between data storage arrays. The data storage array 12 can include one or more device interfaces 23 that enable data transfers to/from the data storage devices 16a-n. The data storage interface 23 can also include device interface modules, such as a disk adapter (DAs 30 (e.g., storage media controller), flash drive interface 35, and the like. The system 12 can have the interface 23, DA 30 and drive interface 35 as part of its back-end architecture, which interfaces with the disks 16a-n via, e.g., a physical link 115.

One or more internal logical communication paths can exist between the device interfaces 23, the RAs 40, the HAs 21, and the memory 26. An embodiment, for example, can use one or more internal busses and/or communication modules. For example, the global memory 25b can be used to transfer data and other communications between the device interfaces, HAs and/or RAs in a data storage array. In one embodiment, the device interfaces 23 can perform data operations using a cache that can include in the global memory 25b, for example, when communicating with other device interfaces and other components of the data storage array. The portion 25a is a memory that can be used in connection with other designations that can vary in accordance with each embodiment.

Host systems 14a-n can issue input/output (IO) operations through medium 18 that include, e.g., a data read or write requests. The host systems 14a-n can access data stored on the disks 16a-n via one or more logical volumes (LVs). In embodiments, the HA 21 can manage the traffic received from the hosts 14a-n and the LVs. In embodiments, the HA 21 can include a traffic processor 110 that manages NVMe traffic received from the hosts 14a-n as described in greater detail in the following paragraphs.

Figure 2:
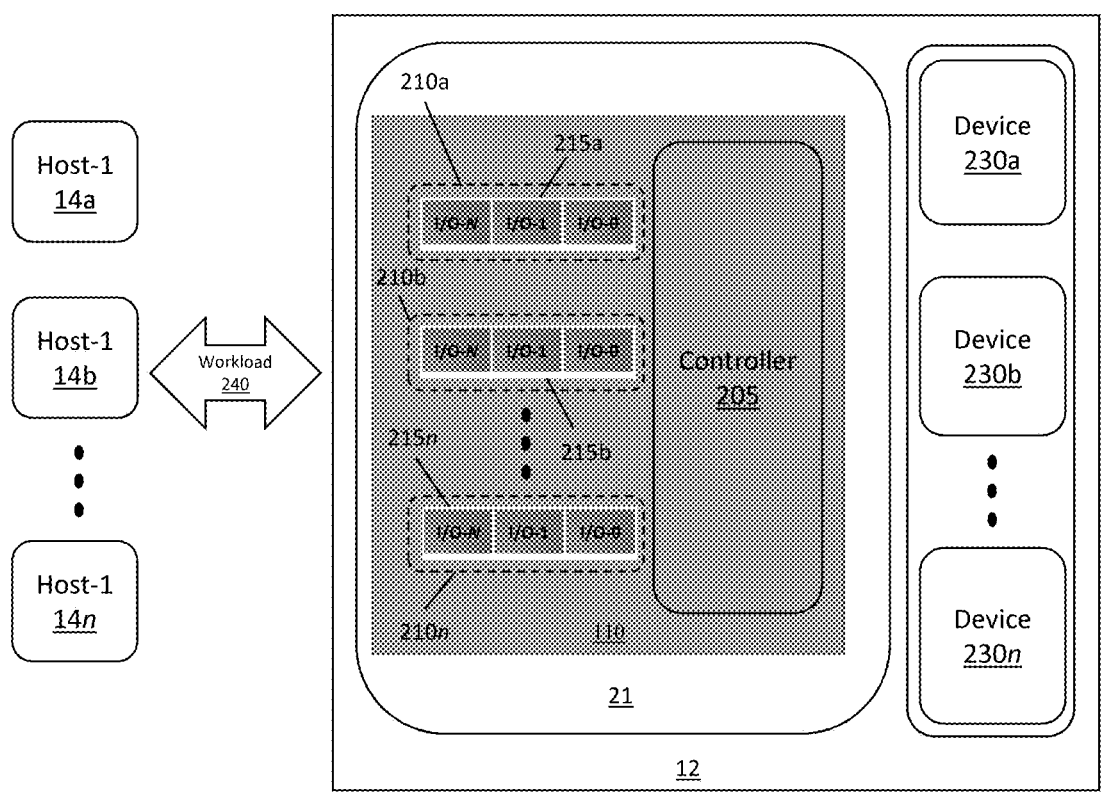
FIG. 2 includes a block diagram of n host adapter in accordance with example embodiments disclosed herein.

Regarding FIG. 2, a storage area network (SAN) 200 includes a storage array 12 that is communicatively coupled to hosts 14a-n. The SAN 200 can be adapted to enable a connectivity primitive such as NVMe. Accordingly, the array 12 and hosts 14a-n can implement an NVMe communication protocol to send and receive IO workloads 240. Further, the array 12 can include a HA 21 and devices 230a-n. Although the embodiment illustrated by FIG. 2 illustrates a single HA, a skilled artisan understands that the array 12 can include a plurality of HAs. The devices 230a-n can be any hardware and/or software resource of the array 12. For example, the devices 230a-n can be substantially like components 23, 25a-b, 26, 30, 35, and 16a-n, amongst other known components of storage arrays as illustrated in FIG. 1.

In embodiments, the HA 21 can include a traffic processor 110 that manages the IO workloads 240 received from the hosts 14a-n. The IO workloads 240 can include IO operations 215a-n such as read and write requests, amongst other known IO operations and SAN communications.

The processor 110 can establish a controller 205 that directs the IO operations 215a-n to certain storage array resources (e.g., devices 230*a-n*). In embodiments, the processor 110 can establish one or more controllers 205. For example, the processor 110 can establish a single controller 205 that controls workloads 240 received by the HA 21 and any other HA of the array 12. In other examples, the processor 110 can establish a set of controllers 205 for each HA 21. Further, the processor 110 can establish each controller as a virtual device that is allocated one or more hardware and/or software resources of the array 12.

In embodiments, the processor 110 can assign each established controller 205 a distinct controller identifier (ID). In an example, the processor 110 can enable each controller to manage access to one or more of the devices 230*a-n* by the IO operations 215*a-n*. In further examples, the processor 110 can establish each controller with a distinct controller ID. Using any ID generation technique, the processor 110 can establish each controller ID based on the devices 230*a-n* each controller 205 is enabled to manage. The processor 110 can generate a searchable controller data structure that maps each controller to corresponding connection IDs and assigned devices 230*a-n*

In further embodiments, the controller 205 can establish one or more IO queues 210*a-n*. Each IO queue 210*a-n* can receive, and buffer IO operations 215*a-n* included in the workload 240. In examples, the controller 205 can designate each queue to buffer one or more of the controller managed devices 230*a-n*. In examples, the controller 205 can assign each queue 210*a-n* a distinct connection ID. Each queue's distinct connection ID can be based on each queue's assigned queue managed controller devices 230*a-n*. Further, each queue 210*a-n* can generate an IO queue index that identifies, e.g., a capacity of each queue 210*a-n*, address (e.g., location) of a next available memory slot that can buffer an incoming IO operation. Additionally, the controller can generate a searchable queue data structure that maps each queue to a corresponding connection ID and assigned devices 230*a-n*.

In embodiments, the hosts 14*a-n* and array 12 can communicatively couple using one or more initialization techniques (e.g., login techniques). During initialization, the hosts 14*a-n* can issue commands (e.g., identify commands) and the controller 205 and/or queues 210*a-n* can broadcast their respective controller and connection IDs. Accordingly, each host 14*a-n* can determine the array 12 to which the controller 205 belongs and the devices 210*a-b* each controller 205 manages using one or both controller and connection IDs. As such, the controller ID and connection ID enable quick and efficient communication that can increase storage array performance (e.g., response times).

For example, each controller ID can include information related to the array (e.g., board and port numbers, array serial number, and system ID, amongst other related array information). Additionally, each connection ID can include information such as a director data, port data, subsystem ID (e.g., an ID corresponding to the queue managed controller devices 230*a-n*) and the IO queue index, amongst other relevant information. Thus, the controller ID and connection ID allow each host 14*a-n* to direct IO operations to a specific queue based on a service level agreement (SLA). The SLA can define performance requirements (e.g., service levels) for each type of IO operation, application source of an IO operation, and user of each host 14*a-n*, amongst other SLA related factors.

For example, each application used by an organization can have different business values. As such, data requests (e.g., IO operations) corresponding to each application can have a traffic priority corresponding to each application's business value. During initialization of a storage array (e.g., array 12), the organization can define quality of service (QoS) (e.g., expected performance envelope) levels for each application. The QoS levels can be grouped based on their respective performance envelopes (e.g., range of input/output operations per second (IOPS)). Each group can be assigned a service level (SL) having designations such as DIAMOND, GOLD, SILVER, AND BRONZE that each define the expected array performance for an IO operation including the designation.

In embodiments, the processor 110 can use one or more machine learning (ML) techniques to anticipate IO workloads and corresponding performance requirements (e.g., service levels (SL)) of each IO operation included in the anticipated workloads. Based on the anticipated IO workloads, the processor 110 can configure each controller 205 to manage certain IO SLs. For example, the processor 110 can provision the controller 205 with resources required to meet specific IO SLs. In embodiment, the resources can correspond to a number and/or type of device of the devices 230*a-n*. Further, the controller 205 can configure each of the queues 210*a-n* to buffer certain IO SLs. As such, the controller 205 can allocate portions of its allocated resources to each queue 210*a-n* to meet specific IO SL requirements.

Further, the controller 205 can be configured to determine a status of each queue 210*a-n*. For example, the controller 205 can determine available index elements (e.g., elements I/O-0-N-n) of each queue 210*a-n*. Using the determined status, the controller 205 can issue an update signal each host 14*a-n*. The update signal can include information related to available queue elements of the queues 210*a-n* and scheduling instructions for issuing 10 operations to one or more of the queues 210*a-n*.

In further embodiments, each host 14*a-n* can include one or more of the connection ID and controller ID to each IO operation to direct each IO operation in the workload 240 to a specific queue and controller based on IO SL requirements. Additionally, each host 14*a-n* can select a connection ID and controller ID to include with an IO operation based on the information contained in the update signal.

The following text includes details of one or more methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts can be required to implement the methods in accordance with the disclosed subject matter.

Figure 3:
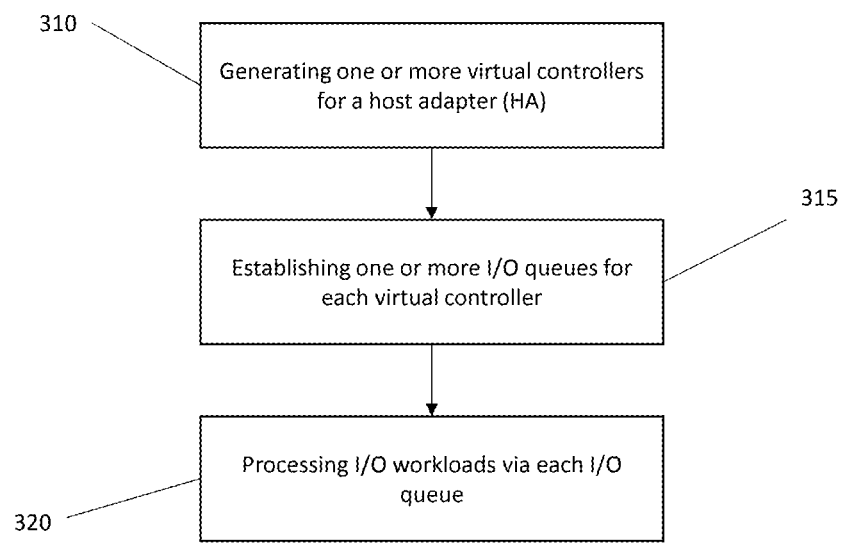
FIG. 3 is a flow diagram of an example method for managing NVMe traffic in accordance with example embodiments disclosed herein.

Regarding FIG. 3, a method 300 can be executed by a device, e.g., the traffic class processor 110 of FIG. 1. The method 300, at 310, can include generating one or more virtual controllers for at least one host adapter (HA) of a storage device. Each virtual controller can be associated with a unique controller identifier (ID). In embodiments, the method 300, at 310, can also include establishing one or more input/output (IO) queues for each virtual controller. The method 300, at 315, can include determining a service level (SL) corresponding to each of the one or more IO operations. In embodiments, the method 300, at 315, can further include processing IO workloads via each IO queue.

It should be noted that the method 300 can be performed according to any of the embodiments described herein, known to those skilled in the art, and/or yet to be known to those skilled in the art.

Figure 4:
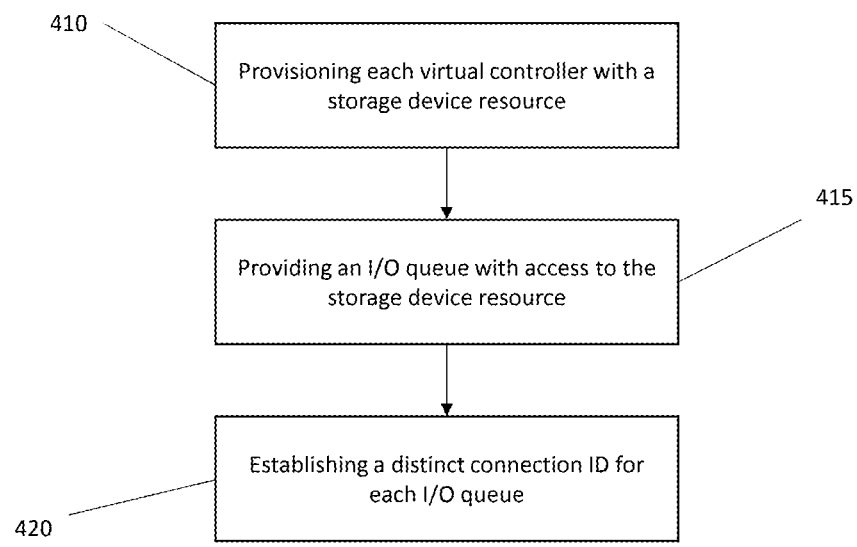
FIG. 4 is a flow diagram of an example method for processing NVMe traffic in accordance with example embodiments disclosed herein.

Regarding FIG. 4, a method 400 can be executed by a device, e.g., the traffic processor 110 of FIG. 1. The method

400, at 410, can include provisioning each virtual controller with one or more storage device resources. The device interface can include, e.g., the DA and traffic class processor. In embodiments, the method 400, at 410, can also providing each IO queue with access to the one or more storage device resources provisioned to the IO queue's respective virtual controller. Further, the method 400, at 415, can include establishing a distinct connection ID for each IO queue.

It should be noted that the method 400 can be performed according to any of the embodiments described herein, known to those skilled in the art, and/or yet to be known to those skilled in the art.

Methods and/or flow diagrams are illustrated with this disclosure for simplicity of explanation. The methods are depicted and described as a series of acts. However, acts in accordance with this disclosure can occur in various orders and/or concurrently, and with other acts not presented and described herein. Furthermore, not all illustrated acts can be required to implement the methods in accordance with the disclosed subject matter.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any digital computer. A processor receives instructions and data from a read-only memory or a random-access memory or both. The essential elements of a computer are a processor for executing instructions and one or more memory devices for storing instructions and data. A computer can include, can be operatively coupled to receive data from and/or transfer data to one or more mass storage devices for storing data (e.g., magnetic, magneto-optical storage media, or optical storage media).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic storage media, internal hard storage media, removable storage media, magneto-optical storage media, CD-ROM, and/or DVD-ROM storage media. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein can be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. A method comprising:
   generating one or more virtual controllers for at least one host adapter (HA) of a storage array, wherein each virtual controller is assigned a unique controller identifier (ID);
   establishing one or more input/output (TO) queues for each virtual controller;
   allocating a portion of the one or more virtual controller's resources to the one or more controller's IO queues based on IO service levels (SLs) related to the one or more IO queues, wherein the resources include memory and storage devices;
   providing each IO queue with metadata that identifies the IO queue's queue depth, total size, and available memory slots;
   based on each IO queue' status, issuing an update IO queue status signal to each remote host corresponding to each IO queue; and
   processing IO workloads via the one or more IO queues.

2. The method of claim 1 further comprising:
   provisioning each virtual controller with one or more storage array resources.

3. The method of claim 2 further comprising:
   providing each IO queue with access to the one or more storage array resources provisioned to the IO queue's respective virtual controller.

4. The method of claim 2 further comprising:
   establishing a distinct connection ID for each IO queue.

5. The method of claim 2 further comprising:
   associating each IO queue with a service level (SL) that defines one or more expected performance metrics for each IO operation queued in each IO queue.

6. The method of claim 5, wherein at least one performance metric corresponds to a range of IO operations per second (IOPS).

7. The method of claim 6 further comprising:
   provisioning each IO queue with the one or more storage array resources based on each queue's assigned SL.

8. The method of claim 5 further comprising:
   establishing communication channels with one or more host devices.

9. The method of claim 5 further comprising:
   providing each host device with information corresponding to each virtual controller and the one or more IO queues established for each virtual controller, wherein the information enables the host device to direct each IO operation to one of the virtual controllers and a particular IO queue based on the IO queue's assigned SL.

10. An apparatus configured to at least one processor configured to:
    generate one or more virtual controllers for at least one host adapter (HA) of a storage array, wherein each virtual controller is assigned a unique controller identifier (ID);
    establish one or more input/output (TO) queues for each virtual controller;
    allocate a portion of the one or more virtual controller's resources to the one or more controller's IO queues based on TO service levels (SLs) related to the one or more IO queues, wherein the resources include memory and storage devices;
    provide each IO queue with metadata that identifies the IO queue's queue depth, total size, and available memory slots;
    based on each IO queue' status, issue an update IO queue status signal to each remote host corresponding to each IO queue; and
    process TO workloads via the one or more IO queues.

11. The apparatus of claim 10 further configured to:
    provision each virtual controller with one or more storage array resources.

12. The apparatus of claim 11 further configured to:
    provide each IO queue with access to the one or more storage array resources provisioned to the IO queue's respective virtual controller.

13. The apparatus of claim 11 further configured to:
    establish a distinct connection ID for each IO queue.

14. The apparatus of claim 11 further configured to:
    associate each IO queue with a service level (SL) that defines one or more expected performance metrics for each TO operation queued in each IO queue.

15. The apparatus of claim 14, wherein at least one performance metric corresponds to a range of IO operations per second (IOPS).

16. The apparatus of claim 15 further configured to:
    provision each IO queue with the one or more storage array resources based on each queue's assigned SL.

17. The apparatus of claim 14 further configured to:
    establish communication channels with one or more host devices.

18. The apparatus of claim 14 further configured to:
    provide each host device with information corresponding to each virtual controller and the one or more IO queues established for each virtual controller, wherein the information enables the host device to direct each IO operation to one of the virtual controllers and a particular IO queue based on the IO queue's assigned SL.

* * * * *